United States Patent
Carnell et al.

[11] Patent Number: 6,139,605
[45] Date of Patent: Oct. 31, 2000

[54] GAS ABSORPTION

[75] Inventors: Peter John Herbert Carnell, Stockton on Tees; Hiren Krishnakant Shethna, Chorlton; Gavin Paul Towler, Huddersfield; Edwin Stephen Willis, Northallerton, all of United Kingdom

[73] Assignee: Imperial Chemical Industries PLC, Millbank, United Kingdom

[21] Appl. No.: 09/371,292

[22] Filed: Aug. 10, 1999

Related U.S. Application Data

[63] Continuation of application No. PCT/GB98/00135, Jan. 15, 1998.

[30] Foreign Application Priority Data

Feb. 11, 1997 [GB] United Kingdom ............... 9702742

[51] Int. Cl.$^7$ .................................................. B01D 53/14
[52] U.S. Cl. ................................. 95/164; 95/169; 95/181; 95/183; 95/204; 95/207; 95/235; 95/236
[58] Field of Search ................................ 95/235, 236, 181, 95/183, 178, 179, 180, 186, 187, 191, 193, 194, 204, 207, 209, 163, 164, 167, 169

[56] References Cited

U.S. PATENT DOCUMENTS

| | | | |
|---|---|---|---|
| 3,104,958 | 9/1963 | Smith et al. ........................... | 95/169 |
| 3,594,985 | 7/1971 | Ameen et al. ........................ | 95/236 |
| 3,718,006 | 2/1973 | Ranke et al. ......................... | 95/236 |
| 4,035,166 | 7/1977 | Van Hecke ........................... | 95/235 |
| 4,050,909 | 9/1977 | Ranke ................................... | 95/235 |
| 4,052,176 | 10/1977 | Child et al. . | |
| 4,332,596 | 6/1982 | Ranke et al. ......................... | 95/179 |
| 4,372,925 | 2/1983 | Cornelisse ............................ | 95/236 |
| 4,381,926 | 5/1983 | Karwat ................................. | 95/236 |
| 4,460,385 | 7/1984 | Pan et al. .............................. | 95/236 |
| 4,797,140 | 1/1989 | Landeck et al. ..................... | 95/181 |
| 5,133,949 | 7/1992 | Elgue et al. .......................... | 95/179 |
| 5,137,550 | 8/1992 | Hegarty et al. . | |
| 5,490,873 | 2/1996 | Behrens et al. ..................... | 95/163 |
| 5,520,724 | 5/1996 | Bauer et al. ......................... | 95/209 |
| 5,782,958 | 7/1998 | Rojey et al. ......................... | 95/209 |
| 6,015,451 | 1/2000 | Anderson et al. ................... | 95/193 |

FOREIGN PATENT DOCUMENTS

| | | |
|---|---|---|
| 0 243 052 B1 | 1/1992 | European Pat. Off. . |
| 0 588 175 | 3/1994 | European Pat. Off. . |
| 0 480 603 B1 | 4/1995 | European Pat. Off. . |
| 0 669 850 B1 | 11/1996 | European Pat. Off. . |
| 0 750 524 B1 | 5/1998 | European Pat. Off. . |
| 96 01678 | 1/1996 | WIPO . |

*Primary Examiner*—Duane S. Smith

[57] ABSTRACT

A double-loop process for the removal of specified gas or gases from a process gas by absorption with a liquid absorbent for said specified gas or gases wherein the process gas is contacted counter-currently in a first absorption stage with semi-lean absorbent liquid and then in a second absorption stage with lean absorbent liquid to give a sweet process gas and the absorbed gases are stripped from the laden absorbent liquid in a first stage giving a semi-lean absorbent liquid. Part of the semi-lean absorbent is recycled to the first absorption stage while the remainder is subjected to further stripping by counter-current contact with an auxiliary gas that has a concentration of the specified gas or gases that is lower than the concentration of the specified gas or gases in the process gas to give the lean absorbent liquid which is recycled to the second absorption stage. The auxiliary gas, which is especially a part stream of the sweet process gas, may be recycled, after use for stripping, to the process gas upstream of the first absorption stage. The process may be integrated with a glycol drying stage with regeneration of the wet glycol by stripping with the part stream of the sweet process gas before the latter is used for stripping the semi-lean absorbent liquid.

15 Claims, 2 Drawing Sheets

GAS ABSORPTION

CROSS-REFERENCES TO RELATED APPLICATIONS

This is a continuation under 35 U.S.C Section 120 of International application Serial Number PCT/GB98/00135 filed on Jan. 15, 1998 which application designates the U.S.

BACKGROUND OF THE INVENTION

This invention relates to the selective absorption of a specified gas or gases from a gas stream and in particular to gas purification, especially the removal of some or all of acidic gas components, such as hydrogen sulphide and carbon dioxide, from gas streams such as natural gas and industrial gases by chemisorption.

Hydrogen sulphide and carbon dioxide often occur in gas streams and it is often desirable to reduce the concentration of hydrogen sulphide and/or carbon dioxide, to a very low level since the acid gases may act as poisons for catalysts with which the process gas is to be contacted or may otherwise be objectionable.

Selected gases may be removed from process gas streams by contact of the gas stream with a liquid absorbent composition that absorbs the specified gas or gases. The loaded absorbent is then separated from the process gas and then subjected to a regeneration process to recover the absorbent for recycle to the absorption step. Where it is desired to reduce the concentration of the specified gas or gases to a very low level, the absorbent is generally selected to be one that reacts with the specified gas or gases. Examples of absorbent liquids suitable for the absorption of acid gases include aqueous solutions of alkanolamines, such as monoethanolamine (MEA), diethanolamine (DEA) and methyl diethanolamine (MDEA), alkali carbonates or phosphates, for example potassium carbonate and tripotassium phosphate, and glycol-amine mixtures.

The absorption of the specified gas or gases by such absorbents is favoured by low temperatures and high pressures, and vice-versa for desorption, i.e. regeneration. Accordingly the absorption step is normally effected by contacting the process gas at a relatively low temperature but at an elevated pressure in an absorption column with a stream of the absorbent liquid flowing counter-current to the process gas. The specified gas or gases are absorbed by the absorbent giving a loaded liquid absorbent stream and a treated process gas stream containing a reduced proportion of the specified gas or gases. For convenience such a treated process stream containing a reduced proportion of the specified gas or gases is herein termed a sweet process gas. The loaded absorbent is separated from the process gas and then regenerated. The regeneration may involve reducing the pressure and/or heating the loaded absorbent. The specified gas or gases are often stripped from the loaded absorbent by feeding the loaded absorbent to the upper end of a regeneration column provided with a reboiler at the lower end to vaporise part of the absorbent. The vapour, which is primarily water vapour in the case of the aforementioned aqueous solutions since the solute generally has a relatively low volatility, passes up through the column in counter-current vapour/liquid contact with the loaded absorbent: as a result the specified gas or gases are is stripped from the loaded absorbent liquid. At the top of the column, the vapour is condensed and returned to the column. At the lower end of the column, a stream of regenerated, i.e. "lean", absorbent liquid is taken and recycled to the absorption stage. Usually heat exchange is effected between the cold, loaded, absorbent liquid stream taken from the absorption stage and the hot, lean, absorbent stream taken from the stripping column prior to return of the latter, generally after further cooling, to the absorption stage. The most severe disadvantage of this arrangement is that it cannot reduce the concentration of the specified gas or gases in the sweet process gas to a value lower than a few ppm by volume without using excessive amounts of energy. Because of this it is common practice to require a further purification process, for example based upon adsorption technology, to operate on the sweet process gas downstream of the absorption plant when it is required that the concentration of the specified gas or gases is reduced to a very low level.

In order to improve the efficiency of the above "single-loop" process, it is known to employ a split stream, i.e. a "double-loop", arrangement. In the double-loop process, the regeneration is effected to give a partially regenerated ("semi-lean") absorbent. Part of this semi-lean absorbent is subjected to further regeneration to give the lean absorbent liquid which is returned to the absorption stage at a location adjacent the outlet of the sweet process gas. The remainder of the partially regenerated, i.e. semi-lean, absorbent is returned to the absorption stage at an intermediate location.

However the double-loop systems have several drawbacks. Firstly this process also has high energy requirements when removing the specified gas or gases to very low concentrations. Secondly, the process uses higher absorbent flow rates than a single-loop process, and thirdly there are practical problems associated with controllability.

BRIEF SUMMARY OF THE INVENTION

In the process of the present invention these problems associated with a double-loop process are overcome by using a gas, hereinafter termed an auxiliary gas, that has a concentration of the specified gas or gases that is lower than the concentration of the specified gas or gases in the process gas, as stripping gas to obtain the lean absorbent. The auxiliary gas is especially a part stream of the sweet process gas. As a result it is possible to reduce the concentration of specified gas or gases in the sweet gas to low levels, e.g. to below 10 ppm by volume in the case of some acid gases, using lower absorbent flow rates and with lower energy requirements than in prior art processes. While it is possible to reduce the concentration of some acid gases to below 4 ppm by volume using a conventional single loop process, excessive amounts of energy and high absorbent flow rates are required. Furthermore it is often not possible in such processes to decrease the acid gas concentration economically to below about 1 ppm by volume. By the process of the invention it is possible to control the concentration of the specified gas at below a desired level which may be below 0.1 ppm by volume. The process of the invention also offers advantages of flexibility and ease of control compared with the prior art processes. The process of the invention may be operated to effect selective or non-selective removal of specified gases. In a non-selective process there may be near total removal of specified gases, whereas in a selective removal process there may be partial removal of one or more specified gases and near total removal of one or more other specified gases.

Accordingly the present invention provides a double-loop process of the kind hereinbefore described for the removal of specified gas or gases from a process gas by absorption with a liquid absorbent for said specified gas or gases wherein the further regeneration of the semi-lean absorbent liquid is effected by stripping with an auxiliary gas that has a concentration of the specified gas or gases that is lower than the concentration of the specified gas or gases in the process gas.

It has been proposed in U.S. Pat. No. 4,052,176 to remove hydrogen sulphide and carbon dioxide from a raw synthesis gas by absorption with a liquid absorbent. In order to obtain a carbon dioxide-rich gas waste stream that can be used for secondary or tertiary recovery of oil by subterranean injection, the primary, or bulk, regeneration of the laden absorbent is effected at least in part by stripping with part of the raw synthesis gas and/or the sweet process gas. Secondary regeneration, to obtain a hydrogen sulphide-rich waste gas is effected by vaporising the absorbent liquid rather than by gas stripping. In contrast thereto, in the present invention, the further, or secondary regeneration, is effected by stripping with gas, especially sweet process gas, that has a concentration of the specified gas or gases that is lower than the concentration of the specified gas or gases in the process gas.

In one form of the invention the process comprises a) contacting a stream of process gas countercurrently with a stream of an absorbent liquid that is capable of selectively absorbing the specified gas or gases from the process gas whereby the specified gas or gases are absorbed from said process gas to give a stream of partially sweetened process gas having a decreased concentration of said specified gas or gases and a stream of loaded absorbent liquid;

b) contacting said partially sweetened process gas countercurrently with a stream of lean absorbent liquid whereby a further amount of said specified gas or gases are absorbed from the partially sweetened process gas to give a sweet process gas having a further decreased concentration of said specified gas or gases and a stream of partially loaded absorbent liquid;

c) subjecting the loaded absorbent liquid stream from step a) to partial regeneration by counter-current contact of said loaded absorbent liquid with vapour obtained by vaporising absorbent liquid whereby the specified gas or gases are stripped from said loaded absorbent liquid to give a semi-lean absorbent liquid stream;

d) subjecting part of said semi-lean absorbent liquid stream from step c) to a further regeneration stage by counter-current contact of said part of the semi-lean absorbent liquid stream with a stream of auxiliary gas that has a concentration of the specified gas or gases that is lower than the concentration of the specified gas or gases in the process gas, thereby producing a stream of lean absorbent liquid and a gas stream containing the specified gas or gases stripped from said semi-lean absorbent liquid;

e) recycling lean absorbent liquid from step d) to step b); and f) using partially loaded absorbent liquid from step b) as part of the absorbent liquid stream employed in step a) and semi-lean absorbent liquid from step c) as the rest of the absorbent liquid stream employed in step a).

In preferred aspects of the process of the present invention, after use for stripping the semi-lean absorbent liquid, the stripping gas is recycled to a suitable position upstream of the absorption stage and/or is used as fuel in the production of the process gas.

Although primarily designed for the removal of acid gases from sour process gas streams, the process of the invention may be used for other instances of where it is desired to absorb one or more components from a gas stream. However for convenience the invention will be further described in relation to the absorption of acid gases as the specified gas or gases.

The steps a) and b) may be combined by employing a single absorption column: the sour gas is fed to the lower end of the column, the lean absorbent liquid from step d) is fed to the upper end of the column, and the semi-lean absorbent liquid recycled from step c) is fed to a suitable location intermediate the upper and lower ends of the absorption column so that it augments the partially laden absorbent liquid flowing down the column from the upper part of the column and produced by absorption of the acid gas from the partially sweetened gas in the upper part of the absorption column.

The present invention arises from an improved understanding of the behaviour of acid gases in aqueous solutions. Thus where the absorbent liquid is one, such as an alkanolamine, that reacts with acid gases, for example via the reactions, $$RNH_2 + H_2S \longleftrightarrow RNH_3HS$$

$$RNH_2 + CO_2 + H_2O \longleftrightarrow RNH_3HCO_3$$

$$2RNH_2 + CO_2 \longleftrightarrow RNHCOONH_3R$$

the gas is chemically bound to the absorbent liquid and so it is extremely difficult to strip the last traces of gas from the absorbent because of the very flat region of a plot of the vapour phase mole fraction of the gas against the liquid phase mole fraction of the gas at low concentrations of the gas. The basic principle behind the process of the invention is that at a given temperature and pressure, acid gases in solution exert a partial pressure of acid gas in the vapour. Where the acid gases are chemically bound to a chemically specific solvent, for example an aqueous solution of an alkanolamine, at low temperatures and high pressures as prevailing in the absorption stage, the vapour-liquid equilibrium favours the transfer of acid gas from the gas phase to the liquid absorbent. At higher temperatures and lower pressures, however, the transfer of acid gas from the liquid absorbent to the vapour phase is favoured. The vapour liquid equilibrium is also a function of the alkanolamine concentration in the liquid. The acid gas exerts a low partial pressure in the gas at low alkanolamine concentrations and vice-versa. The driving force for absorption is therefore favoured by low alkanolamine concentrations, although the capacity of the liquid to retain acid gas in solution is greatly reduced at lower alkanolamine concentrations. Conversely, in the case of the stripping step, a high alkanolamine concentration is desired to improve the driving force that strips the acid gases out of the liquid.

The extent of stripping is governed by the ratio of the vapour rate in the stripping column to the absorbent liquid rate in the column and not to the total liquid flow rate. Also the concentration of acid gas in the treated gas is controlled by the ratio of the absorbent flow rate to the total gas flow rate in the absorption column and by the extent of stripping.

Most of the energy required is to recover the last traces of the specified acid gas or gases from the sour gas. The main energy requirement is to generate the vapour for stripping. In the present invention a significant reduction in energy requirement is obtained by replacing the more conventional stripping medium, viz. vapour obtained by vaporising absorbent liquid, by an auxiliary gas as aforesaid. If the auxiliary gas is sweet process gas or a gas used in the production of the process gas, it can be recycled to an appropriate location upstream of the absorption column or disposed of by other means. As will be described, in some cases sweet process gas used as the auxiliary gas may be subjected to further processing and/or utilised for other applications, before being used as the stripping medium, but it will be appreciated that such further processing or use should not involve the introduction of any significant amount of the specified acid gas.

The auxiliary gas should be used to recover only the last traces of the specified acid gas from the laden absorbent liquid because most of the energy required for stripping is used in recovering the last traces of the specified acid gas from the absorbent liquid and the acid gas recovered from the absorbent liquid as a result of stripping must leave the process to achieve overall acid gas removal. Unless a large amount of auxiliary gas is employed and is not recycled, which would not be economic, the auxiliary gas cannot be used for complete stripping.

Thus in the present invention part of the regeneration is effected conventionally, for example in a primary stripper column operating, when using an alkanolamine solution, between about 70° C. and about 200° C. and at a pressure below the pressure employed for the absorption stage, and then part of the semi-lean absorbent produced in the primary stripping column is subjected to further stripping using the auxiliary gas to produce the lean absorbent employed to absorb the last traces of the specified acid gas from the sour process gas, while the remainder of the semi-lean absorbent is used to remove the bulk of the specified acid gases from the sour process gas. The acid gas stream produced as a result of the primary stripping may be sent for further processing, for example to carbon dioxide recovery or to a Claus plant where sulphur recovery is desired.

The semi-lean absorbent produced in the primary stripping column is thus split into two portions. One portion is cooled and fed to step a), for example to an intermediate point of the absorption column where a single absorption column is employed. The other portion is stripped more thoroughly in a secondary stripping column by the auxiliary gas, for example, where the absorbent is an aqueous alkanolamine solution, at a temperature between about 60° C. and about 175° C. and at a pressure below the absorption pressure. The auxiliary gas flow rate may be relatively small because the flow rate of the semi-lean absorbent fed to the secondary stripper can be relatively small.

Where the auxiliary gas is sweet process gas, it is taken from the sweet process gas stream downstream of the absorption stage and is let down in pressure as necessary to the pressure at which the secondary stripping column is operated. After use for the secondary stripping, the auxiliary gas containing the acid gases stripped from the absorbent in the secondary stripping column may be taken from the upper end of the secondary stripping column, recompressed, and added to the sour process gas fed to the absorption stage. In other cases, the auxiliary gas may be a gas stream, other than the sweet process gas, that has a concentration of the specified gas or gases below the concentration of said gases in the process gas. Thus in some cases, the auxiliary gas may be a gas stream used to produce the gas subjected to the absorption step. Thus synthesis gas may be produced by steam reforming of a desulphurised hydrocarbon feedstock such as natural gas: the steam reforming step converts the feedstock into a mixture containing carbon oxides and hydrogen. It is often desirable to remove the carbon dioxide, possibly after a stage of selective oxidation or the water gas shift reaction wherein the carbon monoxide is converted to carbon dioxide. The process of the invention may be used to effect such carbon dioxide removal. In this case, the auxiliary gas may be the sweet process gas or part of the desulphurised hydrocarbon feedstock gas.

As a result of the process of the invention, the acid gas, such as carbon dioxide or hydrogen sulphide, can be removed economically from the sour process gas to give a sweet process gas having a very low acid gas content, and therefore may avoid the need for a further purification step. By utilising auxiliary gas for stripping in the secondary stripping column, the energy input is decreased compared to using vapour obtained by vaporising absorbent liquid as the stripping gas. This allows reductions to be made in the operating and capital costs and increases process efficiency. The use of part of the auxiliary gas, enables the flow rates for the absorbent to be decreased. Furthermore back-mixing of the acid gases is avoided. More integration of the heat exchange equipment used for heating and cooling of the absorbent can be made using the process of the invention compared to using vapour obtained by vaporising absorbent liquid as the stripping gas in the secondary column by appropriately choosing the operating temperatures and pressures of the primary and secondary stripping columns. This allows reductions to be made in the size of the various items of heat exchange equipment. The use of the auxiliary gas as the stripping gas lowers the partial pressure of water vapour in the secondary stripping column, enabling the latter to be operated at a lower temperature than the primary stripping column. Thus by appropriately adjusting the temperature of the secondary stripping column, fewer corrosion problems are encountered in the secondary stripping column and heat exchangers. Hence a cheaper material of construction can be employed.

As mentioned above, in some cases the auxiliary gas may be subjected to further treatment and/or utilised for another operation prior to use for the stripping operation. One example of this is where the sweet process gas is a hydrogen/nitrogen mixture to be used for ammonia synthesis, normally after a methanation and drying step: in this case the auxiliary gas may be purge gas from the ammonia synthesis loop. Another example is where the sweet process gas is dried using a glycol dehydration unit. Thus in such a unit, the sweet process gas from the upper end of the acid gas absorption column is contacted in a further absorption column, herein termed a glycol absorber, with a countercurrent flow of glycol which absorbs water from the sweet gas giving a dried sweet process gas and wet glycol. The wet glycol is then dried in a stripping column, herein termed a glycol stripper, and recycled to the glycol absorber. A part stream of the sweet process gas is used as the stripping medium in the glycol stripper before being fed as the auxiliary gas to the stripping column used to strip acid gas from the semi-lean absorbent liquid to produce the lean absorbent liquid. Such an arrangement has a number of advantages. For example if the sweet gas contains aromatic hydrocarbons, some of the aromatic hydrocarbons may be absorbed into the glycol. In a conventional glycol dehydration unit, such hydrocarbons, together with the water absorbed from the sweet process gas, are separated in the glycol stripper. Not only does this represent a loss of valuable hydrocarbons, but also it generates an effluent disposal problem. By using the auxiliary gas as the stripping medium in the glycol stripper, such water and hydrocarbons are transferred into the auxiliary gas stream which is then used for stripping the semi-lean absorbent liquid. If the spent auxiliary gas, i.e. the auxiliary gas after use for stripping the semi-lean absorbent liquid, is recycled to the sour process gas stream upstream of the acid gas absorption column, the water and any such aromatic hydrocarbons are recycled. The recycle of the water reduces the amount of water that has to be added, e.g. as steam injected into the stripping column treating the part of the semi-lean absorbent liquid, to restore the water balance. Also the use of the part of the sweet gas as the stripping gas in the glycol stripper decreases the amount of energy required for glycol stripping, reduces the size and duties of heat exchangers in the glycol dehydration unit, and enables the use of lower temperatures in the glycol stripper, giving rise to a less corrosive environment.

The invention is of particular utility in removing some or all of the acid gases such as hydrogen sulphide and carbon dioxide from hydrocarbon gas streams such as natural gas. Another particular use of the invention is for the removal of carbon dioxide from ammonia synthesis gas: by means of the invention, the carbon dioxide content may be reduced to a very low level so that the amount of hydrogen consumed in a subsequent methanation step to remove residual traces of carbon oxides is minimised. In this latter embodiment, as mentioned above, the auxiliary gas may be sweet process gas, before or after such a methanation step or after ammonia synthesis, e.g. ammonia synthesis purge gas, or the auxiliary gas may be desulphurised hydrocarbon feedstock used to make the ammonia synthesis gas. The spent auxiliary gas may be recycled to upstream of the absorber, e.g. added to the feedstock from which the synthesis gas is produced, or used as fuel, e.g. as part of the fuel employed in the production of the synthesis gas.

As explained above, in the process of the invention the laden absorbent liquid is subjected to a primary regeneration giving semi-lean absorbent, part of which is then subjected to further regeneration using the auxiliary gas. It will be appreciated that where a number of absorbers are used in parallel, there may be a single regeneration unit fed with laden absorbent from all the absorbers. Alternatively, each absorber may have its associated primary regeneration column, but a single secondary, or further, regeneration column is employed producing lean absorbent liquid which is fed to each of the absorbers.

The process of the present invention may be used to upgrade an existing single loop system. Thus by addition of the secondary, or further, regeneration column, modification to the absorber to provide for two absorbent liquid entry points and provision of a suitable supply of auxiliary gas to the secondary regeneration column, a single loop system could be converted to a double loop system in accordance with the invention.

BRIEF DESCRIPTION OF THE SEVERAL VIEWS OF THE DRAWINGS

The invention will now be described with reference to the accompanying drawings wherein.

DETAILED DESCRIPTION OF THE INVENTION

Figure 1:
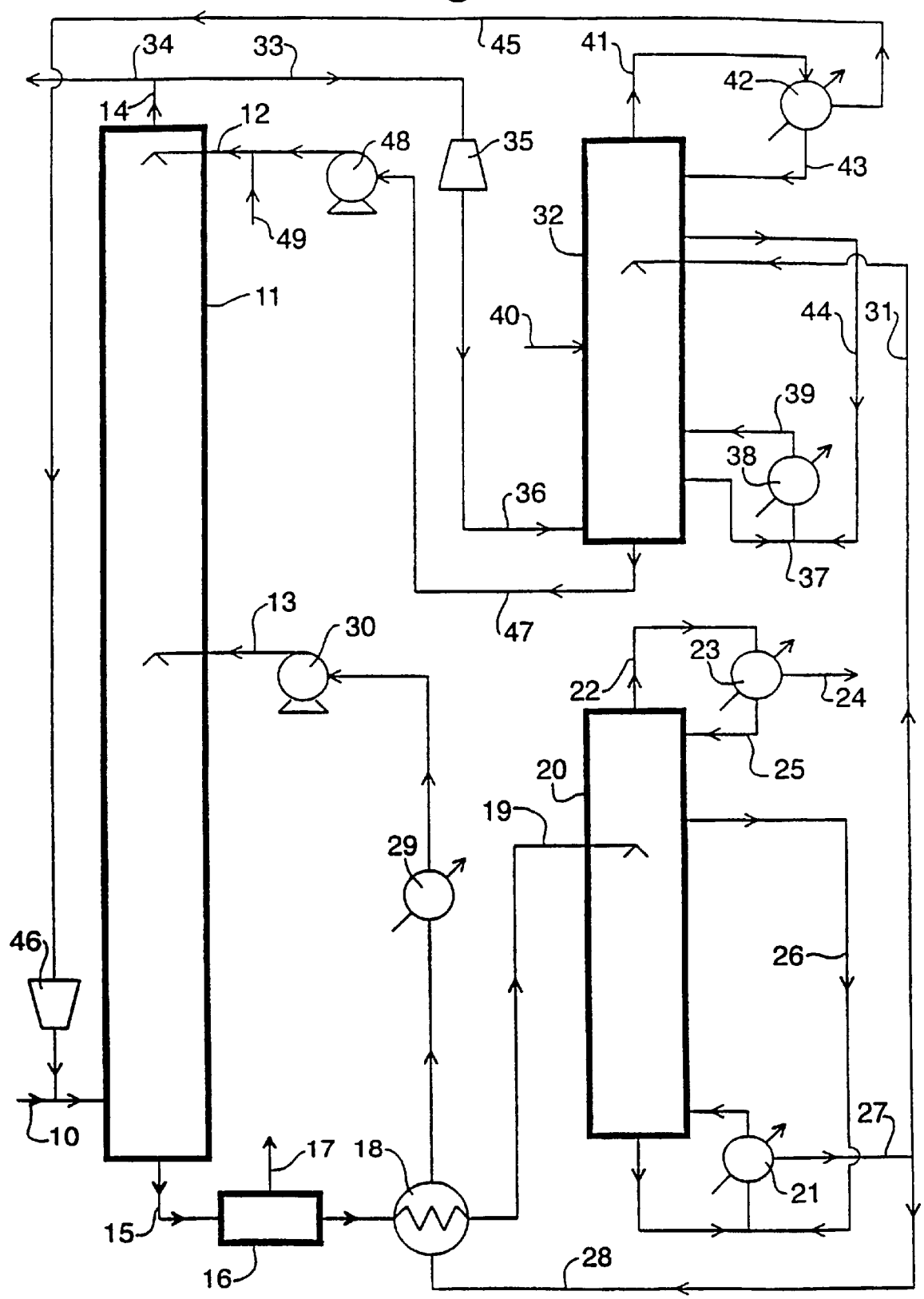
FIG. 1 is a diagrammatic flow sheet of the process.

Referring to FIG. 1, a sour process gas, of e.g. methane containing acid gases such as carbon dioxide and hydrogen sulphide, typically in a concentration of about 0.1% to 50% by volume or more, is fed, at a relatively high pressure and low temperature, e.g. at 40 bar abs. and at a temperature in the range of from about 5° C. to about 60° C., via line 10 to the lower end of an absorption column 11 and flows up through the column 11 counter-current to absorbent flowing down the column. Lean absorbent, e.g. aqueous methyl diethanolamine solution, is fed, via line 12 to the upper end of the column and semi-lean absorbent is fed via line 13 to a location intermediate the upper and lower ends of column 11. Sweet process gas leaves the upper end of column 11 via line 14. The absorbent laden with acid gases absorbed from the sour process gas leaves the lower end of column 11 via line 15.

Thus the sour gas is scrubbed against semi-lean absorbent near the middle and lower end of the absorption column 11 and against lean absorbent near the top of the absorption column 11 to absorb most of the specified gas while passing most of the other gases in the sour gas out of the absorption step. The bulk of the absorption takes place near the bottom of the absorption column 11 by using semi-lean absorbent. Only the last traces of the specified gas are removed from the gas in the top section of the absorption column 11.

The ratio of the absorbent liquid flow to the flow of sour gas at the bottom of absorption column 11 can also vary within wide limits, and it is preferred for reasons of economy that the laden absorbent liquid leaving the absorption step contains about 40 to 95%, typically about 80%, of the value of the specified acid gas concentration in the liquid phase that would be in equilibrium with the partial pressure of the specified acid gas in the sour gas feed. If the ratio of the absorbent liquid flow rate to the gas flow rate is too large, unnecessarily large amounts of absorbent must be processed in the stripping stages. On the other hand, if the ratio of the absorbent flow rate to the sour gas flow rate is too small, process performance will be impaired.

The pressure of the laden absorbent is reduced to e.g. below about 4 bar abs. and some of the acid gases separate in flash vessel 16. The use of such a flash vessel is not essential and is here employed primarily to remove any components, such as methane, that were physically absorbed into the absorbent liquid. It is advantageous to separate such physically absorbed components before stripping if the sour gas produced in the stripping process is to be further processed, e.g. in a Claus process for the recovery of sulphur. The separated acid gases are discharged from the flash vessel 16 via line 17: the remaining laden absorbent liquid is heated in heat exchanger 18 to a temperature somewhat below its boiling point at the prevailing pressure, typically to a temperature in the range of from about 50° C. to about 135° C. and at a pressure between about 1 and 4 bar abs. The laden absorbent liquid is then fed, via line 19, to the upper end of a primary stripping column 20. The laden absorbent flows down column 20.

The absorbent liquid at the lower end of primary stripping column 20 is heated in primary reboiler 21 (which is heated by condensing steam from a steam line) to generate the vapour necessary for stripping the acid gases from the laden absorbent. This vapour rises up through the stripping column 20 countercurrent to the laden absorbent liquid flowing down column 20. The temperature of the primary reboiler 21 will of course depend on the primary stripping column operating pressure and will normally be within the range of about 70° C. to about 200° C., and preferably within the range of about 110° C. to about 140° C., while maintaining the pressure between about 1.6 to about 2.4 bar abs. The temperature in the primary reboiler 21 should not be too high when using conventional absorbents such as aqueous methyl diethanolamine or diethanolamine solutions as this can lead to corrosion problems. Higher temperatures may be used if corrosion inhibitors are added to the absorbent as is well known in the art.

The vapour rising from primary reboiler 21 is mainly water vapour since alkanolamines have a low volatility. At the top of the primary stripping column 20, the vapour carrying the acid gases stripped from the laden absorbent is passed via line 22 and condensed in a primary condenser 23 cooled by a suitable medium, e.g. cooling water. The uncondensed acid gases leave primary condenser 23 via line 24. The condensate, which is mainly water saturated with acid gases, is returned via primary reflux line 25 to the column 20 in order to maintain the overall water balance in the stripping column. There are several options for returning the condensate. However we have found that the best option is to return the condensate to the top of the primary stripping column 20 and then to withdraw nearly all the liquid from a location just above the laden absorbent feed 19 into a primary condensate return line 26. The section of the primary stripping column 20 above the laden absorbent feed 19 thus acts as a direct heat exchanger between the reflux flowing downwards and the vapour rising up the column 20. The temperature of the condensate is thus raised nearly to the temperature of the primary stripping column 20. The liquid withdrawn through primary condensate return line 26 is returned to a location near to the bottom of the primary stripping column 20, or, as shown in the drawing, to the feed to primary reboiler 21. By withdrawing the condensate in primary condensate return line 26, the concentration of alkanolamine in the liquid in the primary stripping column 20 is maximised. As indicated above the vapour-liquid equilibrium of the acid/gas alkanolamine system is favoured by a high alkanolamine concentration under stripping conditions. The performance of the stripping column is therefore enhanced by recycling the condensate to a location near to the bottom of the stripping column 20 or to the reboiler 21. This leads to a lower energy consumption.

Semi-lean absorbent liquid is withdrawn from the lower end of the primary stripping column 20, or from the primary reboiler 21, via line 27 and most of it is recycled to a location intermediate the upper and lower ends of the absorption column 11. Thus most of the semi-lean absorbent withdrawn via line 27 is fed, via line 28, to heat exchanger 18, where it is cooled by heating the laden absorbent being fed, via line 19, to the primary stripping column 20, is then cooled further in heat exchanger 29 with e.g. cooling water to a temperature, typically in the range of about 20° C. to about 60° C., and is then fed, via circulating pump 30, as the semi-lean absorbent fed to absorption column 11 via line 13. Typically 70 to 99%, preferably 80 to 95%, of the semi-lean absorbent liquid withdrawn via line 27 is fed via line 28 to the absorption column.

The remaining part of the semi-lean absorbent from line 27 is fed, via a secondary stripper feed line 31, to the upper end of a secondary stripping column 32 for further stripping. The semi-lean absorbent flows down secondary stripping column 32 counter-current to gas flowing up through the column 32.

Part, typically 0.01 to 5%, preferably less than 2%, of the sweet process gas stream from line 14 is taken via line 33 as auxiliary gas. The remainder of the sweet process gas is exported via line 34. The auxiliary gas is expanded in a throttle 35 to a pressure, typically in the range 1 to 4 bar abs., slightly above the secondary stripping column operating pressure, and is fed, via line 36, to the lower end of the secondary stripping column 32 to form the stripping gas in the secondary stripping column 32.

Instead of employing a throttle to effect expansion of the auxiliary gas, the latter may be expanded in a turbine e.g. providing part of the recompression power. In this case however, the benefit of cooling the lean absorbent as hereinafter described may be decreased, necessitating additional cooling of the lean absorbent from the bottom of secondary stripping column 32.

The auxiliary gas flows up through secondary stripping column 32 stripping out the residual acid gas from the semi-lean absorbent flowing counter-current down through the secondary stripping column 32. The temperature of the secondary stripping column 32 is maintained at the desired level, typically in the range of about 60° C. to about 150° C., by taking absorbent taken from a suitable location at the lower end of secondary stripping column 32 via line 37, vaporising the absorbent in a secondary reboiler 38 which is heated by a suitable fluid, and returning the resulting vapour to the lower end of the secondary stripping column 32 via line 39. Steam may be injected into secondary stripping column 32 via line 40 to supply additional heat thereto and to compensate for the inevitable loss of water into the acid gas stream 24 discharged from the primary stripping column 20 and possible loss of water into the sweet gas leaving the process via line 34. The amount of water lost into the sweet process gas will depend on the humidity of the sour gas feed.

By suitable selection of the operating conditions, e.g. operating the secondary stripping column at a lower temperature than the primary stripping column, it is possible that the heat required for secondary reboiler 38 may be supplied by heat exchange with the semi-lean absorbent fed to heat exchanger 18 via line 28 before it is fed to heat exchanger 18. Thus the secondary reboiler 38 may be operated without an external heat source. The duty of the secondary reboiler may be fixed such that there exists a temperature approach greater than about 5° C. The quantity of steam injected via line 40 into the secondary stripping column 32 is substantially equal to the amount of water lost by entrainment in the waste acid gas stream 24 and in the sweet process gas stream 34. In some cases it may be possible to dispense with the secondary reboiler 38 if sufficient steam is injected to maintain the secondary stripping column at the desired temperature.

The auxiliary gas, containing the acid gas stripped from the semi-lean absorbent liquid, leaves the secondary stripping column 32 via line 41 and is fed to a secondary condenser 42 where it is cooled, by heat exchange with a suitable coolant, e.g. water, to a temperature typically between about 20° C. and about 60° C. and condensed liquid is returned to the top of the secondary stripper column 32 via secondary reflux line 43. In a similar arrangement to that of the primary stripping column, nearly all of the liquid is withdrawn from the upper end of the secondary stripper column 32 just above the semi-lean absorbent feed 31 into a secondary condensate return line 44 and is returned to the secondary stripping column 32 at a suitable location in the lower part of the column above the location at which the auxiliary gas is introduced. Where a secondary reboiler is employed, the secondary condensate is returned to the column at a location no lower than the secondary reboiler feed line 37, or, as shown in the drawing, to the feed to secondary reboiler 38.

In the section of the secondary stripping column 32 below the secondary reboiler 38 (if any), direct heat exchange takes place between the auxiliary gas and the lean absorbent. As indicated above, the auxiliary gas taken from the relatively a high pressure sweet gas leaving the top of the absorption column 11, is expanded in throttle 35 to reduce its pressure. Due to the Joule-Thompson expansion the auxiliary gas cools to a low temperature, typically in the range from about −150° C. to +50° C., depending on the temperature of the sweet gas leaving absorption column 11 and on the degree of pressure reduction. When this cold auxiliary gas contacts the hot lean absorbent in the bottom section of the secondary stripping column 32 below the secondary reboiler 38 (if any), the lean absorbent is cooled to a temperature between about −100° C. and +100° C., preferably within the range +10° C. to +50° C. The temperature to which the lean absorbent is cooled will depend on the relative flow rates of the auxiliary gas and lean absorbent, the temperature to which the auxiliary gas is cooled by the expansion step, and the temperature of the hot lean absorbent. There may therefore be no need for further cooling of the lean absorbent before it is fed to the top of the absorption column 11. The bottom portion of the secondary stripping column 32 below the secondary reboiler 38, if any, which acts as a direct heat exchanger may be replaced by an indirect heat exchanger.

The temperature of the semi-lean absorbent that is introduced into the absorption column via line 13 may vary within wide limits. Normally the semi-lean absorbent is introduced at a temperature below 75° C., both to enhance the absorption of the acid gas in the cooler absorbent liquid and to reduce losses of absorbent liquid by vaporisation. However there is not much economic advantage in using absorbent temperatures lower than those that can be achieved using coolant water as a coolant; thus it is seldom economic to chill the absorbent liquid using a refrigeration device. As indicated above, the auxiliary gas cools as it expands in throttle 35 and this cool auxiliary gas serves to cool the lean solvent in the lower end of secondary stripping column 32.

The uncondensed gas from condenser 42, i.e. auxiliary gas, containing the acid gas stripped from the semi-lean absorbent, may be recompressed and recycled to a location upstream of the absorption column 11. Thus the uncondensed gas may be fed, via line 45, to a compressor 46 where it is recompressed to the sour gas feed pressure and then added to the sour gas from line 10 and the mixture fed to the absorption column 11. Instead of recompressing the uncondensed gases, they may be sucked into the sour gas stream using an ejector. Alternatively, instead of recycling the uncondensed gas from condenser 42 to the sour gas, it may be used as fuel for supplying energy requirements of e.g. the primary reboiler and/or for other plant associated with the production of the sour gas and/or further processing of the treated gas exported via line 34 and/or the waste acid gas stream 24.

Lean absorbent liquid is taken from the bottom of secondary stripping column 32 via line 47 and fed, via a circulating pump 48, to the lean absorbent feed line 12. A make-up stream of fresh absorbent is added as required, via line 49, to the lean absorbent stream before the latter is fed to the absorption column 11.

The lean absorbent flow rate is controlled such that the absorbent liquid flow rate in the upper section of absorption column 11 is greater than the minimum rate required in that section to achieve the desired degree of acid gas removal. It will be appreciated that the lower the liquid flow rate in the upper part of the absorption column, the lower is the net energy consumption.

There is an economic balance between the rate of flow of auxiliary gas and the duty of the primary reboiler 21. If the reboiler duty is increased, the energy requirement for the primary reboiler is increased but the required auxiliary gas flow rate is decreased and recompression costs are lower. Conversely a low primary reboiler duty gives a decreased reboiler energy requirement but increased auxiliary gas flow rates and recompression costs. The process should therefore be designed with values of auxiliary gas flow rates and primary reboiler duties that will lead to overall minimum costs.

It can be seen that the process divides the conventional regeneration step into two stages. The first stage achieves bulk regeneration and the second stage recovers the last traces of the specified acid gases. The first stage, employing primary stripping column 20, requires a relatively small amount of energy. In prior art processes utilising two stripping stages, the second stage effecting the removal of the traces of the specified acid gas from the semi-lean absorbent to give the lean absorbent, controls the energy use of the process. However, in the process of the present invention, a relatively small amount of energy is supplied in the secondary reboiler and indeed, as described above, secondary reboiler may be omitted or it may operate with no external heat source. This leads to a large reduction in the energy requirement and therefore makes the process economically viable for much higher degrees of acid gas removal or to much lower concentrations of acid gas in the product sweet gas compared with prior art double loop designs.

The absorbents used in the process of the invention are generally corrosive to the materials of construction. Corrosion may be minimised by a number of techniques, for example by the addition of corrosion inhibitors. The process of the invention reduces the risk of corrosion to most of the equipment other than the primary stripping column 20, the primary reboiler 21 and the secondary reboiler 38, if any. The secondary stripping column 32 and the heat exchanger 18, which are important capital cost items, can be operated at a lower temperature than in the prior art double-loop processes and can therefore be constructed from cheaper materials.

Figure 2:
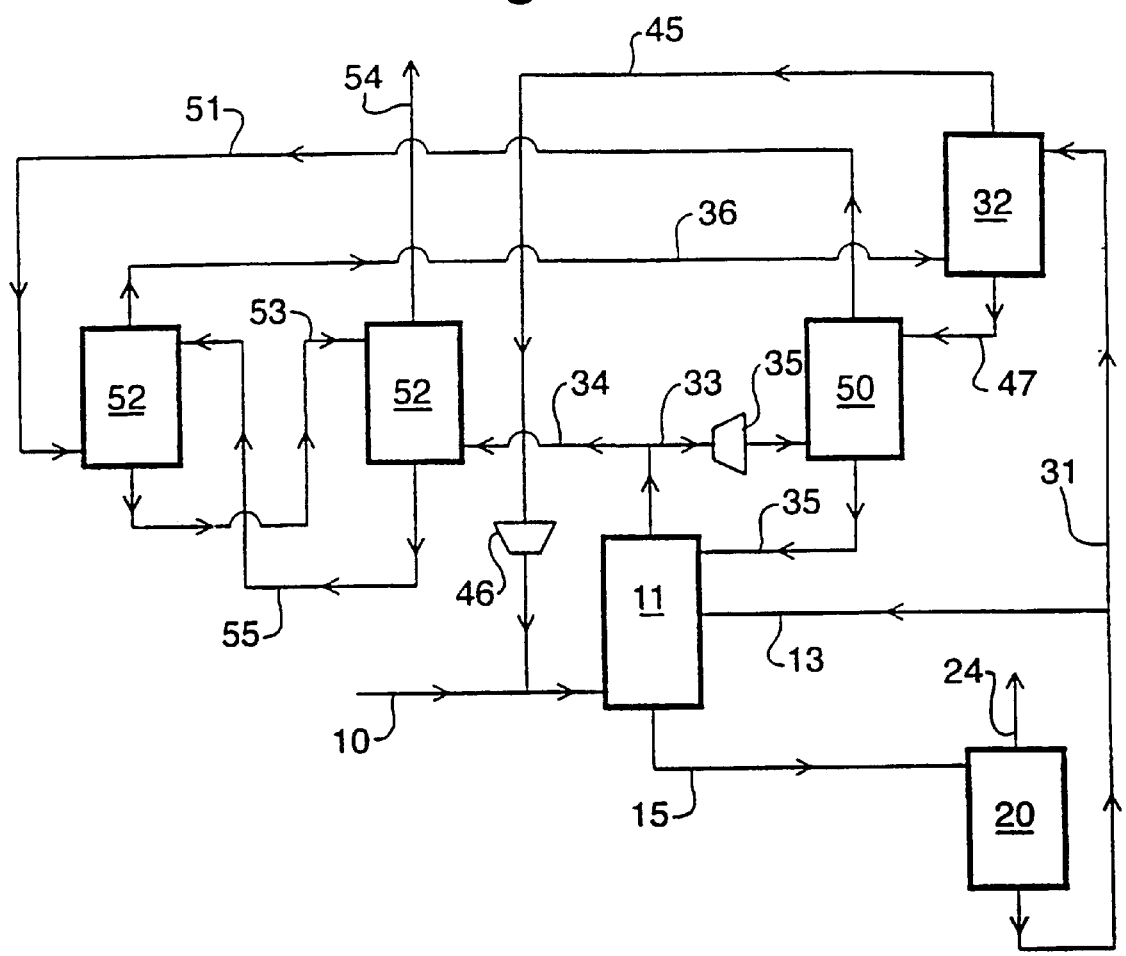
FIG. 2 is block diagram of a modification of the flow sheet of FIG. 1 wherein the process is integrated with a downstream glycol dehydration operation.

In FIG. 2, integration of the process of FIG. 1 with a glycol dehydration unit is shown. For simplicity the heat exchangers, reboilers, condensers, condensate recycle lines, flash vessel etc. have been omitted from FIG. 2.

The sour gas is fed via line 10, together with recycled auxiliary gas from compressor 46, are fed to the absorption column 11 wherein the acid gases are scrubbed from the sour gas using semi-lean absorbent fed via line 13 and lean absorbent liquid fed via line 12. The laden absorbent liquid is taken from the lower end of the absorption column 11 via line 15, fed to a flash vessel (not shown) and then to the upper end of the primary stripping column 20. Acid gas is discharged via line 24 while semi-lean absorbent liquid is taken from the lower end of stripping column 20. Part of the semi-lean absorbent liquid is fed, via line 31, to the secondary stripping column 32 while the remainder, after heat exchange (not shown) with the laden absorbent before the latter is fed to column 20, is fed to the absorption column 11 via line 13. In the secondary stripping column 32, the semi-lean absorbent liquid is stripped with auxiliary gas fed via line 36. The spent auxiliary gas is recycled from the top of the secondary stripper column 32 to compressor 46 via line 45. As in the embodiment of FIG. 1, a part of the sweet process gas from absorber 11 is taken via line 33 and expanded in a throttle 35 to give a cool part stream of the sweet process gas. This cool part stream of the sweet process gas is then contacted in a vessel 50 with a counter-current flow of the lean absorbent liquid fed via line 47 from the lower end of the secondary stripping column 32. Thus serves to cool the lean absorbent liquid which is then returned, via line 12, to the upper end of the absorption column 11, and to heat the part stream of the sweet process gas, which leaves vessel 50 via line 51.

The remainder of the sweet process gas is fed, via line 34, to the lower end of a glycol absorption column 52 wherein it is contacted with a counter-current flow of dry glycol fed to the upper end of column 52 via line 53. The dry glycol absorbs water from the sweet process gas and the resultant dry sweet process gas leaves the upper end of absorption column 52 via line 54. The glycol containing the water absorbed from the sweet process gas leaves the lower end of the absorption column 52 via line 55 and is fed to the upper end of a glycol stripping column 56 after heat exchange (not shown) with the dry glycol fed to absorption column 52 via line 53.

The heated part stream of sweet process gas from vessel 50 is fed, via line 51, to the lower end of the glycol stripping column 56 where it flows up through the column 56 counter-current to the glycol flowing down that column from line 55. The heated part stream of sweet process gas strips water from the wet glycol giving dry glycol which is returned, after heat exchange as aforesaid, via line 53 to the upper end of absorption column 52. The gas from the upper end of column 56 is then fed as the auxiliary gas, via line 36, to the lower end of the secondary stripping column 32. The glycol stripping column 56 may be provided with a reboiler, if necessary, at its lower end and also, at its upper end, with a condenser to condense liquid from the spent stripping gas.

It is seen that as a result of this arrangement, the water vapour in the sweet process gas is removed by the glycol absorber and transferred to the auxiliary gas used to strip the semi-lean absorbent liquid. This transferred water vapour is thus returned to the acid gas absorption stage via the stream 47 of lean absorbent liquid and the spent auxiliary gas recycled via line 45 and so the amount of steam that need be injected (not shown) into secondary stripping column in order to restore the water balance is decreased.

It will be appreciated that in the arrangement of FIG. 2, the part stream of the sweet process gas employed for the stripping of the glycol stripper and the secondary stripper may be taken from the dry sweet gas stream 54 instead of from the sweet gas stream leaving the acid gas absorption column 11.

The process of the present invention may also be integrated with other processes for removal of components from gas streams. For example solid regenerable or non-regenerable adsorbents may be employed to remove certain components.

For example, the aforesaid glycol drying system may be replaced by molecular sieve driers: in some cases it may be possible to use the part stream of sweet process gas as the gas used to regenerate such molecular sieves. In this case it may be desirable to take the part stream of sweet process gas from the dried sweet process gas stream rather than from the sweet process gas stream leaving the acid gas absorption column.

The sweet process gas may also contain impurity components, for example carbonyl sulphide, mercaptans, and mercury, that are not readily absorbed by the absorbent liquid. Such components may be removed from the sweet process gas by passing the sweet process gas through a bed of a suitable particulate adsorbent. Examples of suitable adsorbents include oxides, hydroxides, carbonates or basic carbonates of metals such as copper and/or zinc. In particular the compositions of EP 243 052 or EP 750 524 are of utility in removing carbonyl sulphide and mercaptans and any traces of hydrogen sulphide that remain after the acid gas absorption step. Indeed, it may be advantageous to operate the acid gas absorption stage to reduce the hydrogen sulphide content to a suitable level, for example to 10 to 50 ppm by volume, and then use such beds to reduce the hydrogen sulphide content to a desired lower level. Beds of copper sulphide particles may be employed to remove traces of mercury and/or arsenic. As described in EP 480 603 it may be desirable to effect mercury removal simultaneously with hydrogen sulphide. Again, to this end, it may be desirable to operate the acid gas absorption stage such that the sweet process gas contains some hydrogen sulphide which can be adsorbed simultaneously with mercury. A bed of a suitable basic adsorbent particles, such as alkalised alumina particles, may be employed where it is desired to remove final traces of carbon dioxide.

In some cases, where a fixed bed of a particulate adsorbent capable of adsorbing hydrogen sulphide is provided to polish the sweet process gas, it may be desirable to provide for the part stream of sweet process gas employed for stripping the semi-lean absorbent liquid to be taken from the sweet process gas, at least during start-up of the process, after passage through such an adsorbent bed. This ensures that the auxiliary gas to be used for stripping the semi-lean absorbent liquid is free from hydrogen sulphide while the acid gas absorption stage is being started up and so assists control of the start-up process.

It may also be desirable to employ fixed beds of particulate adsorbents to treat the spent auxiliary gas stream, e.g. to remove hydrogen sulphide therefrom, where it is desired not to recycle the latter to the acid gas absorption stage but to use the spent auxiliary gas as a fuel. Alternatively by the use of such a fixed bed treating the spent auxiliary gas, the hydrogen sulphide in the latter may be removed so that the spent auxiliary gas can then be added to the product sweet process gas rather than returned to the sour gas upstream of the acid gas absorption column. However, it is preferred that the spent auxiliary gas is compressed before contact with such an adsorbent bed.

In another embodiment, the spent auxiliary gas containing the gas stripped from the semi-lean absorbent liquid is purified to remove that stripped gas and the auxiliary gas is then recycled to the semi-lean absorbent stripping column, i.e. the secondary stripping column. In this case, a purge stream is taken from the recycled auxiliary gas and a part stream taken from the sweet process gas is added to the circulating auxiliary gas as make-up gas. The purge stream may be recycled to the sour gas stream. In this case it may be desirable to effect the secondary stripping at essentially the process gas pressure, i.e. at a pressure significantly greater than the pressure of the primary stripping column. It will be appreciated that in this case there will not be the benefit of cooling by expansion of the part stream of the sweet process gas, and so there may be a need for cooling of the lean absorbent liquid by an external coolant, e.g. cooling water, but re-compression costs may be minimised. Purification of the spent auxiliary gas before recycle thereof to the secondary stripping column may be effected as described above by employing a bed of a suitable particulate adsorbent material.

Where the process of the invention is employed to remove hydrogen sulphide from the process gas and it is desired that the auxiliary gas is purified, i.e. some or all of the hydrogen sulphide stripped from the semi-lean absorbent liquid is removed from the auxiliary gas, before the auxiliary gas is recycled to the stripping column or used as a fuel or added to the sweet process gas, it is possible to effect that purification at a relatively low pressure, e.g. without re-compressing the auxiliary gas, by employing the process of EP 669 850 to effect the purification. Thus, applying the process of EP 669 850, the spent auxiliary gas is scrubbed against a stream of alkaline aqueous hypochlorite solution. The hydrogen sulphide is scrubbed from the auxiliary gas into the hypochlorite solution. We have found that little, if any, of any hydrocarbons in the auxiliary gas process are scrubbed into the hypochlorite stream. The hypochlorite solution is then passed through a bed of a suitable catalyst, e.g. a supported nickel oxide-containing composition which effects decomposition of the hypochlorite under conditions conducive to the oxidation of the hydrogen sulphide therein. The hydrogen sulphide is oxidised to water and sulphate and/or sulphite ions. The resulting solution is then recycled to the scrubber together with a make-up amount of fresh hypochlorite solution and alkali. A purge stream from the circulating liquid is discharged as an effluent. In this process where the auxiliary gas leaving the scrubber is recycled to the sweet process gas or to the stripping column, the sweet process gas may become contaminated with chloride. It is therefore preferred that the sweet process gas, or the scrubbed auxiliary gas where the latter is added to the sweet process gas, is passed through a bed of suitable chloride adsorbent particles, for example particles of alkalised alumina or granules having a high sodium content as described in EP 746 409. Where the scrubbed auxiliary gas is added to the sweet process gas, the scrubbed auxiliary gas should be compressed before passage through the chloride adsorbent.

The invention is further illustrated by the following calculated examples (wherein all percentages are expressed as mole %) using the arrangement shown in FIG. 1.

Example 1

In this example the process of the invention is utilised to effect selective removal of hydrogen sulphide in order to reduce the hydrogen sulphide content of a sour gas stream containing 94% methane, 4% hydrogen sulphide and 2% carbon dioxide to about 4 ppm by volume and to remove about half the carbon dioxide.

The sour gas is fed at a pressure of 40 bar abs. and at 35° C. at a flow rate of 5000 kg/h as stream 10 to absorption column 11 where it is contacted counter-currently with an aqueous solution of methyl diethanolamine (MDEA) flowing at a rate of about 4007 kmol/h. The bulk (about 3446 kmol/h -91.5%) of the latter is fed, as a semi-lean absorbent liquid containing about 13% methyl diethanolamine, at 36.5° C. and at 40 bar abs. to the middle of the column via line 13 while the remainder (about 342 kmol/h) is fed at 35° C. and 40 bar abs. as lean absorbent solution containing about 12% methyl diethanolamine to the upper end of column 11 via line 12. The difference between the MDEA concentrations of streams 12 and 13 arises primarily through condensation of the steam injected into the secondary stripping column diluting the solution. This decrease in the MDEA concentration is beneficial for absorption in the upper portion of the absorption column 11. Essentially all of the hydrogen sulphide and about half of the carbon dioxide is absorbed by the solution giving sweet process gas, containing about 4 ppm by volume hydrogen sulphide and about 1% carbon dioxide, which leaves the absorption column via line 14 at about 39° C. and at 40 bar abs.

The laden absorbent solution which is heated as a result of the heat of reaction occurring upon absorption of the acid gases in the column 11, is let down to about 2 bar abs. in flash vessel 16. A small amount of gas, containing about 42% hydrogen sulphide and about 13% carbon dioxide, flashes off. The residual laden absorbent solution is then heated to about 90° C. in heat exchanger 18 and fed as stream 19 to the primary stripping column operating at 2 bar abs. with a reboiler temperature of about 124° C. The bulk (about 92%) of the semi-lean absorbent solution taken from the primary reboiler 21 as stream 27 at a temperature of about 124° C. is fed, via line 28 and heat exchanger 18, as the semi-lean absorbent solution fed to the absorption column 11 via line 13. The remainder of the semi-lean absorbent solution taken from reboiler 21 as stream 27 is fed, as stream 31, to the secondary stripping column 32, which is operated at a pressure of about 1.5 bar abs. with a reboiler temperature of about 100° C. Reboiler 38 is heated by heat exchange with stream 28 before the latter is fed to heat exchanger 18. Steam at about 3 bar abs. and 150° C. is injected via line 40 to make up for water losses (in the acid gas stream 24, in the treated process gas exported via line 34, and in the gas flashed from vessel 16), and to supplement the heating given by reboiler 38.

A small part (about 0.3%) of the sweet process gas is taken as auxiliary gas and let down to 2 bar abs. in throttle 35 which effects cooling to give an auxiliary gas stream 36 at a temperature of about −80° C. This is fed to the lower part of secondary stripping column 32 where it cools the lean absorbent solution in the lower end of column 32 below secondary reboiler offtake 37 from about 95° C. to about 35° C. The auxiliary gas effects thorough stripping of the semi-lean absorbent fed to secondary stripping column 32. The cooled lean absorbent is taken from the bottom of secondary stripping column 32 and fed, together with make-up solution as required, to the upper end of the absorption column via line 12.

The spent auxiliary gas separated in condenser 42 is recycled via line 45 and compressor 46 and added to the feed sour gas supplied via line 10 and the mixture is fed to the absorption column 11.

The temperature, pressure and composition of the various streams are shown in the following Table 1.

The amount of steam required to heat the primary reboiler 21 is about 14.2 te/h and the total flow rate of MDEA solution, i.e. the combined flow rates of streams 12 and 13, is 121.8 m$^3$/h. By way of comparison, it is calculated that to obtain a similar degree of acid gas removal using a single loop arrangement, the steam requirement for the reboiler is about 54 te/h and the total MDEA solution flow rate is 162.9 m$^3$/h.

TABLE 1

| Stream | Temperature (° C.) | Pressure (bar abs) | Flow rate (kmol/h) | | | | |
|---|---|---|---|---|---|---|---|
| | | | $CH_4$ | $H_2O$ | $CO_2$ | $H_2S$ | MDEA |
| 10 | 35 | 40 | 4700.00 | 0.00 | 100.00 | 200.00 | 0.00 |
| 13 | 36.5 | 40 | 0.00 | 3181.19 | 0.22 | 7.20 | 475.81 |
| 12 | 35 | 40 | 0.00 | 301.31 | 0.13 | 0.03 | 40.81 |
| 14 | 38.6 | 40 | 4711.50 | 8.55 | 49.59 | 0.02 | 0.00 |
| 17 | 59.6 | 2 | 2.58 | 0.63 | 0.97 | 3.08 | 0.00 |
| 15 | 59.6 | 2 | 2.63 | 3473.98 | 50.80 | 207.80 | 516.62 |
| 19 | 89.6 | 2 | 0.05 | 3473.34 | 49.83 | 204.71 | 516.62 |
| 24 | 50 | 1.7 | 0.05 | 19.29 | 49.60 | 196.90 | 0.00 |
| 28 | 123.8 | 2 | 0.00 | 3181.19 | 0.22 | 7.20 | 475.81 |
| 31 | 123.8 | 2 | 0.00 | 272.87 | 0.02 | 0.62 | 40.81 |
| 40 | 150 | 3 | 0.00 | 29.96 | 0.00 | 0.00 | 0.00 |
| 33 | 38.6 | 40 | 14.13 | 0.03 | 0.15 | 0.00 | 0.00 |
| 47 | 35 | 1.5 | 0.00 | 301.31 | 0.13 | 0.03 | 40.81 |
| 45 | 50 | 1.3 | 14.13 | 1.55 | 0.04 | 0.59 | 0.00 |

Example 2

In this example the process of the invention is employed to effect the non-selective removal of carbon dioxide and hydrogen sulphide from a sour gas stream containing 84% methane, 10% ethane, 4% hydrogen sulphide and 2% carbon dioxide to give a sweet gas containing essentially no carbon dioxide and about 0.25 ppm by volume hydrogen sulphide.

The process conditions are similar to that of Example 1 except that a greater flow rate of absorbent liquid is employed, a smaller proportion (3.5%) of the semi-lean absorbent from the primary stripping column is fed to the secondary stripping column, and a greater proportion (about 1.3%) of the sweet process gas is employed as stripping gas.

The temperatures, pressures and flow rates are as shown in the following Table 2.

TABLE 2

| Stream | Temp. (° C.) | Pressure (bar abs) | Flow rate (kmol/h) | | | | | |
|---|---|---|---|---|---|---|---|---|
| | | | $CH_4$ | $C_2H_6$ | $H_2O$ | $CO_2$ | $H_2S$ | MDEA |
| 10 | 35 | 41 | 4200.00 | 500.00 | 0.00 | 100.00 | 200.00 | 0.00 |
| 13 | 36.5 | 40 | 0.00 | 0.00 | 4490.07 | 6.37 | 63.60 | 671.30 |
| 12 | 31.3 | 40 | 0.00 | 0.00 | 156.21 | 0.00 | 0.05 | 24.35 |
| 14 | 38 | 40 | 4252.07 | 506.21 | 8.14 | <0.0005 | 0.001 | 0.00 |
| 17 | 59.1 | 2.9 | 3.10 | 0.36 | 0.44 | 1.23 | 2.40 | 0.00 |
| 15 | 59.1 | 2.9 | 3.21 | 0.37 | 4638.15 | 106.60 | 265.91 | 695.65 |
| 19 | 88 | 2.9 | 0.11 | 0.01 | 4637.71 | 105.37 | 263.51 | 695.65 |
| 24 | 50 | 1.7 | 0.11 | 0.01 | 23.18 | 98.76 | 197.53 | 0.00 |
| 28 | 112 | 1.8 | 0.00 | 0.00 | 4490.10 | 6.39 | 63.68 | 671.30 |
| 31 | 112 | 1.8 | 0.00 | 0.00 | 162.85 | 0.23 | 2.31 | 24.35 |
| 40 | 150 | 3 | 0.00 | 0.00 | 38.43 | 0.00 | 0.00 | 0.00 |
| 33 | 38 | 40 | 55.28 | 6.58 | 0.11 | 0.00 | 0.00 | 0.00 |
| 47 | 35 | 1.5 | 0.01 | 0.00 | 156.21 | 0.00 | 0.05 | 24.35 |
| 45 | 50 | 1.3 | 55.27 | 6.58 | 6.74 | 0.23 | 2.26 | 71.08 |

The amount of steam required to heat the primary reboiler 21 is about 14.9 te/h and the total flow rate of MDEA solution, i.e. the combined flow rates of streams 12 and 13, is about 167 m$^3$/h. By way of comparison, it is calculated that to obtain a similar degree of acid gas removal, i.e. to a hydrogen sulphide content of about 0.25 ppm by volume, if a conventional double-loop process is used, the amount of steam required for the reboiler would be about 52.9 te/h and the total flow rate of MDEA solution would be about 193 m$^3$/h. Also by way of comparison, it is calculated that using a conventional single loop arrangement to obtain a similar degree of acid gas removal, i.e. to a hydrogen sulphide content of about 0.25 ppm by volume, the steam requirement for the reboiler would be about 11 8.5 te/h. If the single-loop process is used to effect removal of the hydrogen sulphide only to 10 ppm by volume, instead of to about 0.25 ppm by volume, the steam requirement would be about 19.1 te/h, i.e. still significantly greater than in the process of the invention.

What is claimed is:

1. A double-loop process for the removal of at least one specified gas from a process gas comprising:
    a) in a first absorption stage, contacting a stream of process gas counter-currently with a stream of an absorbent liquid that is capable of selectively absorbing the specified gas from the process gas whereby the specified is absorbed from said process gas to give a stream of partially sweetened process gas having a decreased concentration of said specified and a stream of loaded absorbent liquid;
    b) in a second absorption stage, contacting said partially sweetened process gas counter-currently with a stream of lean absorbent liquid whereby a further amount of said specified gas is absorbed from the partially sweetened process gas to give a sweet process gas having a further decreased concentration of said specified gas and a stream of partially loaded absorbent liquid;
    c) subjecting the loaded absorbent liquid stream from step a) to partial regeneration by counter-current contact of said loaded absorbent liquid with vapour obtained by vaporising absorbent liquid whereby the specified gas is stripped from said loaded absorbent liquid to give a semi-lean absorbent liquid stream;
    d) using partially loaded absorbent liquid from step b) as part of the absorbent liquid stream employed in step a) and part of the semi-lean absorbent liquid from step c) as the rest of the absorbent liquid stream employed in step a);
    e) subjecting the remainder of said semi-lean absorbent liquid stream from step c) to a further regeneration stage by counter-current contact of said part of the semi-lean absorbent liquid stream with an auxiliary gas stream that is part of the sweet process gas or is a gas used in the production of the process gas, said auxiliary gas having a concentration of the specified gas that is lower than the concentration of the specified gas in the process gas, thereby producing a stream of lean absorbent liquid and a gas stream containing the specified gas stripped from said semi-lean absorbent liquid; and
    f) recycling lean absorbent liquid from step e) to step b).

2. A process according to claim 1 wherein the auxiliary gas is 0.01 to 5% of said sweet process gas.

3. A process according to claim 1 wherein 70 to 99% of the semi-lean absorbent liquid from the partial regeneration stage is used as absorbent liquid in the first absorption stage.

4. A process according to claim 1 wherein the auxiliary gas is recycled, after use in the further regeneration stage, to the process gas upstream of the first absorption stage.

5. A process according to claim 1 wherein the partial regeneration of the loaded absorbent liquid is effected by:
    a) feeding the loaded absorbent liquid to the upper part of a stripping column wherein it is stripped by counter-current contact with vapour obtained by vaporising part of the absorbent liquid;
    b) taking vapour containing the stripped gases from the top of the column and cooling it to condense liquid therefrom;
    c) returning the condensed liquid to the upper part of the column to a location above the location of the feed of the loaded absorbent liquid to the column;
    d) withdrawing liquid from the upper part of the column, from a location below the location of the return of condensed liquid but above the location of the feed of loaded absorbent liquid;

e) returning the withdrawn liquid to the lower end of the column at a location below the location of the feed of the loaded absorbent liquid; and f) withdrawing semi-lean absorbent liquid from the lower end of the column.

6. A process according to claim 1 wherein the further regeneration of the semi-lean absorbent liquid is effected by:

a) feeding the semi-lean absorbent liquid to the upper part of a stripping column wherein it is stripped by counter-current contact with the auxiliary gas supplied to the lower part of the column;

b) taking a gas containing the stripped gases from the top of the column and cooling it to condense liquid therefrom;

c) returning the condensed liquid to the upper part of the column to a location above the location of the feed of the semi-lean absorbent liquid to the column;

d) withdrawing liquid from the upper part of the column, from a location below the location of the return of condensed liquid but above the location of the feed of semi-lean absorbent liquid;

e) returning the withdrawn liquid to the lower end of the column at a location below the location of the feed of the semi-lean absorbent liquid; and f) withdrawing lean absorbent liquid from the lower end of the column.

7. A process according to claim 6 wherein the column is provided at its lower end with a reboiler to which liquid is fed from the column and the liquid withdrawn from the upper part of the column is returned to the lower end of the column to a location not below the location from which liquid is fed to the reboiler.

8. A process according to claim 1 wherein the further regeneration of the part of the semi-lean absorbent liquid with auxiliary gas is effected in a column provided with a reboiler, and heat required for said reboiler is provided by heat exchange with the remainder of the semi-lean absorbent liquid before the latter is recycled to the first absorption stage.

9. A process according to claim 1 wherein the absorption stages are effected at elevated pressure and part of the sweet process gas is reduced in pressure from the pressure of the absorption stage by passage through a throttle thereby effecting cooling of that part of the sweet process gas to give a stream of cooled sweet gas, said lean absorbent liquid is cooled by direct or indirect heat exchange with the stream of cooled sweet gas before said lean absorbent liquid is returned to the second absorption stage, and said stream of cooled sweet gas is used as the auxiliary gas.

10. A process according to claim 1 wherein the sweet process gas is dried by counter-current contact with a dry glycol stream thereby giving a stream of dry sweet process gas and a stream of wet glycol, the stream of wet glycol is stripped with a part stream of sweet process gas thereby giving a stream of regenerated glycol which is recycled as said dry glycol stream, and, after use for stripping the wet glycol, the part stream of sweet process gas is used as the auxiliary gas.

11. A process according to claim 1 wherein the auxiliary gas is a part stream of the sweet process gas and the sweet process gas is passed through one or more beds of a particulate adsorbent capable of removing impurities in said sweet process gas before or after taking the part stream used as the auxiliary gas.

12. A process according to claim 1 wherein the further regeneration of the semi-lean absorbent liquid is effected at a pressure substantially equal to the pressure of the process gas and part of the auxiliary gas containing the gas stripped from the semi-lean absorbent liquid is recycled, together with fresh auxiliary gas, to the further regeneration stage while the remainder of the auxiliary gas containing the gas stripped from the semi-lean absorbent liquid is recycled to the process gas stream upstream of the first absorption stage, and, before said recycle to the further regeneration stage, said part of the auxiliary gas containing the gas stripped from the semi-lean absorbent liquid is passed through a bed of adsorbent particles effective to adsorb at least some of the gas stripped from the semi-lean absorbent liquid.

13. A process according to claim 1 wherein hydrogen sulphide is absorbed from the process gas by the absorbent liquid and, after use for stripping the semi-lean absorbent liquid, at least part of the gas containing hydrogen sulphide stripped from the semi-lean absorbent liquid is scrubbed with an alkaline aqueous hypochlorite solution to scrub hydrogen sulphide from said gas, and said hypochlorite solution containing hydrogen sulphide scrubbed from said gas is passed through a bed of a particulate catalyst effective to decompose said hypochlorite and to oxidise said hydrogen sulphide and then recycled to said scrubbing step.

14. A process according to claim 13 wherein the scrubbed gas, together with a fresh quantity of auxiliary gas, is used for stripping the semi-lean absorbent liquid.

15. A process according to claim 13 wherein the auxiliary gas is sweet process gas and the scrubbed gas is compressed and added to the remainder of the sweet process gas and the compressed scrubbed gas, or the sweet process gas after addition of the scrubbed gas, is passed through a bed of particles of an adsorbent material effective to adsorb chloride from the gas.

* * * * *